Oct. 8, 1935.  A. L. BOWER  2,016,767

PLACE CARD TALLY

Filed March 11, 1932

Fig. 1.

| My Number is 1 | | | | My Number is 2 | | | |
|---|---|---|---|---|---|---|---|
| Game | At | With | Score | Game | At | With | Score |
| 1 | A | 4 | | 1 | B | 3 | |
| 2 | B | 6 | | 2 | C | 5 | |
| 3 | A | 8 | | 3 | C | 7 | |
| 4 | C | 10 | | 4 | A | 11 | |
| 5 | B | 12 | | 5 | A | 9 | |
| 6 | C | 3 | | 6 | A | 4 | |
| 7 | A | 9 | | 7 | C | 8 | |
| 8 | C | 5 | | 8 | A | 6 | |
| 9 | B | 7 | | 9 | A | 10 | |
| 10 | A | 11 | | 10 | C | 12 | |
| Total | | | | Total | | | |
| Name | | | | Name | | | |

Fig. 2.

| My Number is 3 | | | | My Number is 4 | | | |
|---|---|---|---|---|---|---|---|
| Game | At | With | Score | Game | At | With | Score |
| 1 | B | 2 | | 1 | A | 1 | |
| 2 | A | 12 | | 2 | C | 11 | |
| 3 | B | 10 | | 3 | A | 5 | |
| 4 | A | 8 | | 4 | B | 9 | |
| 5 | B | 6 | | 5 | A | 7 | |
| 6 | C | 1 | | 6 | A | 2 | |
| 7 | A | 11 | | 7 | C | 6 | |
| 8 | C | 9 | | 8 | B | 12 | |
| 9 | B | 5 | | 9 | C | 8 | |
| 10 | C | 7 | | 10 | B | 10 | |
| Total | | | | Total | | | |
| Name | | | | Name | | | |

Fig. 3.

| My Number is 5 | | | | My Number is 6 | | | |
|---|---|---|---|---|---|---|---|
| Game | At | With | Score | Game | At | With | Score |
| 1 | B | 8 | | 1 | C | 9 | |
| 2 | C | 2 | | 2 | B | 1 | |
| 3 | A | 4 | | 3 | B | 11 | |
| 4 | B | 12 | | 4 | C | 7 | |
| 5 | C | 10 | | 5 | B | 3 | |
| 6 | B | 11 | | 6 | A | 10 | |
| 7 | B | 7 | | 7 | C | 4 | |
| 8 | C | 1 | | 8 | A | 2 | |
| 9 | B | 3 | | 9 | A | 12 | |
| 10 | A | 9 | | 10 | B | 8 | |
| Total | | | | Total | | | |
| Name | | | | Name | | | |

Fig. 4.

| My Number is 7 | | | | My Number is 8 | | | |
|---|---|---|---|---|---|---|---|
| Game | At | With | Score | Game | At | With | Score |
| 1 | C | 12 | | 1 | B | 5 | |
| 2 | A | 10 | | 2 | B | 9 | |
| 3 | C | 2 | | 3 | A | 1 | |
| 4 | C | 6 | | 4 | A | 3 | |
| 5 | A | 4 | | 5 | C | 11 | |
| 6 | B | 9 | | 6 | C | 12 | |
| 7 | B | 5 | | 7 | C | 2 | |
| 8 | A | 11 | | 8 | B | 10 | |
| 9 | B | 1 | | 9 | C | 4 | |
| 10 | C | 3 | | 10 | B | 6 | |
| Total | | | | Total | | | |
| Name | | | | Name | | | |

Fig. 5.

| My Number is 9 | | | | My Number is 10 | | | |
|---|---|---|---|---|---|---|---|
| Game | At | With | Score | Game | At | With | Score |
| 1 | C | 6 | | 1 | A | 11 | |
| 2 | B | 8 | | 2 | A | 7 | |
| 3 | C | 12 | | 3 | B | 3 | |
| 4 | B | 4 | | 4 | C | 1 | |
| 5 | A | 2 | | 5 | C | 5 | |
| 6 | B | 7 | | 6 | A | 6 | |
| 7 | A | 1 | | 7 | B | 12 | |
| 8 | C | 3 | | 8 | B | 8 | |
| 9 | C | 11 | | 9 | A | 2 | |
| 10 | A | 5 | | 10 | B | 4 | |
| Total | | | | Total | | | |
| Name | | | | Name | | | |

Fig. 6.

| My Number is 11 | | | | My Number is 12 | | | |
|---|---|---|---|---|---|---|---|
| Game | At | With | Score | Game | At | With | Score |
| 1 | A | 10 | | 1 | C | 7 | |
| 2 | C | 4 | | 2 | A | 3 | |
| 3 | B | 6 | | 3 | C | 9 | |
| 4 | A | 2 | | 4 | B | 5 | |
| 5 | C | 8 | | 5 | B | 1 | |
| 6 | B | 5 | | 6 | C | 8 | |
| 7 | A | 3 | | 7 | B | 10 | |
| 8 | A | 7 | | 8 | B | 4 | |
| 9 | C | 9 | | 9 | A | 6 | |
| 10 | A | 1 | | 10 | C | 2 | |
| Total | | | | Total | | | |
| Name | | | | Name | | | |

INVENTOR.

Alvin L. Bower.

BY

Jesse P. Langley

ATTORNEY.

Patented Oct. 8, 1935

2,016,767

UNITED STATES PATENT OFFICE 2,016,767

PLACE-CARD TALLY

Alvin L. Bower, Pittsburgh, Pa.

Application March 11, 1932, Serial No. 598,212

1 Claim. (Cl. 283—49)

My invention relates to place-card tallies to be used during the playing of a series of games for guiding each player as to the locations and the partners for the successive games of the series.

The place-card tallies of my invention are suitable for various kinds of games but are particularly adapted for contract and auction bridge for all of which games they also serve as score cards.

It is a primary object of my invention to provide a set of place-card tallies for any suitable number of players and that are so arranged that certain or selected pairs of players do not play as partners with each other during the entire series.

It is a further object of my invention to so arrange a set of place-card tallies such as those described above that couples or certain pairs of players are neither partners nor opponents during the entire series.

My improved arrangement of place-card tallies are particularly adapted for use by clubs or members of parties in which the players consist almost or entirely of married couples. It is well known that controversies or ill-feeling may result over the incidents of play when married couples are partners and sometimes when opponents.

With these place-card tallies, members of couples do not play at the same table during the entire series of games. This arrangement also insures increased contact of the various players with other than those of the same families during any given series of games.

In the accompanying drawing, Figs. 1 to 6 respectively represent the place-card tallies of a set for twelve players and arranged and separately joined together in pairs in accordance with my invention.

Inasmuch as it is desirable that each player play one game with each other available player, each tally is arranged for ten games at tables designated, by way of example, A, B and C. Each tally bears a number of the series 1 to 12 which is the number of the player holding it.

The tallies are arranged in pairs for convenient distribution to couples or pairs of players. While the arangement as to pairs of tallies may be as desired in advance of their preparation, those illustrated are in pairs in order of their numbers as 1—2, 3—4, . . . 9—10 and 11—12.

Tallies 1 and 2, which will be first considered, are typical of the other pairs. It will be noted that player No. 1 does not play any game of the series with player No. 2 and, of course, the reverse is true. A comparison of the two tallies will also show that player No. 1 and player No. 2 are not at the same table during any game of the series.

The same situation exists with respect to the pair of tallies 3 and 4 and players 3 and 4 holding them and also as to each other pair of tallies and the corresponding players.

In the use of the tallies, the proper distribution may be secured in several convenient ways. For example, each pair of tallies may be detachably secured together and given to a couple, the lady in each case retaining, for example, the tally of even number. The distribution as to ladies and gentlemen may also be secured by using cords or ribbons of different colors for the tallies of odd and even numbers, respectively.

The names of historical characters or other designations may be substituted for the numbers of the tallies and the players and, in such case, the proper distribution as to ladies and gentlemen may be secured in any suitable manner such as by the names themselves, the shapes of the tallies, or by the colors of the cords or ribbons attached to them.

While I have described and illustrated my improved tallies as adapted for three tables of four players each, the same principles are equally applicable to sets for two or four or more tables. However, if more than five tables are used, it is preferable to use two or more sets of tallies for the proper total number of tallies. Less confusion results from the latter arrangement.

In case of two tables or eight players, the number of games will be six and, if desired, some or all of these be repeated. In each case, the number of games on the tally will ordinarily not exceed two less than the number of players and may be less than that number in the case of a large number of players.

My improved tallies may, if desired, be so arranged that their use to prevent certain players from playing as partners may be optional. All of the couples may play as partners at the same time by adding a game on each tally, preferably at the end of the series, in which players 1 and 2 are partners, as are players 3 and 4, and similarly for the other pairs of players.

This additional game may be suitably identified on the tally as by a danger sign and this game may be omitted or played, as desired. The arrangement of the tallies in pairs and the playing of all of the couples as partners simultaneously makes this optional use possible.

My invention is not to be limited except as specified in the claim.

I claim as my invention:

A place-card set for games played progressively involving a plurality of tables and two pairs of players at each table, comprising a set of cards having player identifying symbols and placing symbols to constitute placing-cards, the set of said place-cards being segregated into pairs each pair comprising two place-cards initially separably joined to each other to initially determine and segregate the players to whom the respective original pairs of place-cards may be given, upon initial distribution of the place-card set at the beginning of the games, into pairs of players to be separated from play with each other during subsequent progress of the games, and each place-card of each initial pair having the placing instructions denoted thereon previous to their initial distribution and so corresponding with like instructions on the individual place-cards of other initial pairs of the set as to constitute predetermined indication means to place the individual holders of the members of the original pairs, after the initial distribution and separation, at the same tables with the individual holders of other individual place-cards of the set, other than the holder of the companion place-card of the same original pair, to the end of a predetermined continuous series of successive games.

ALVIN L. BOWER.